April 13, 1965 R. C. HAUZE 3,178,481
DINITROTOLUENE MANUFACTURE
Filed Jan. 7, 1963
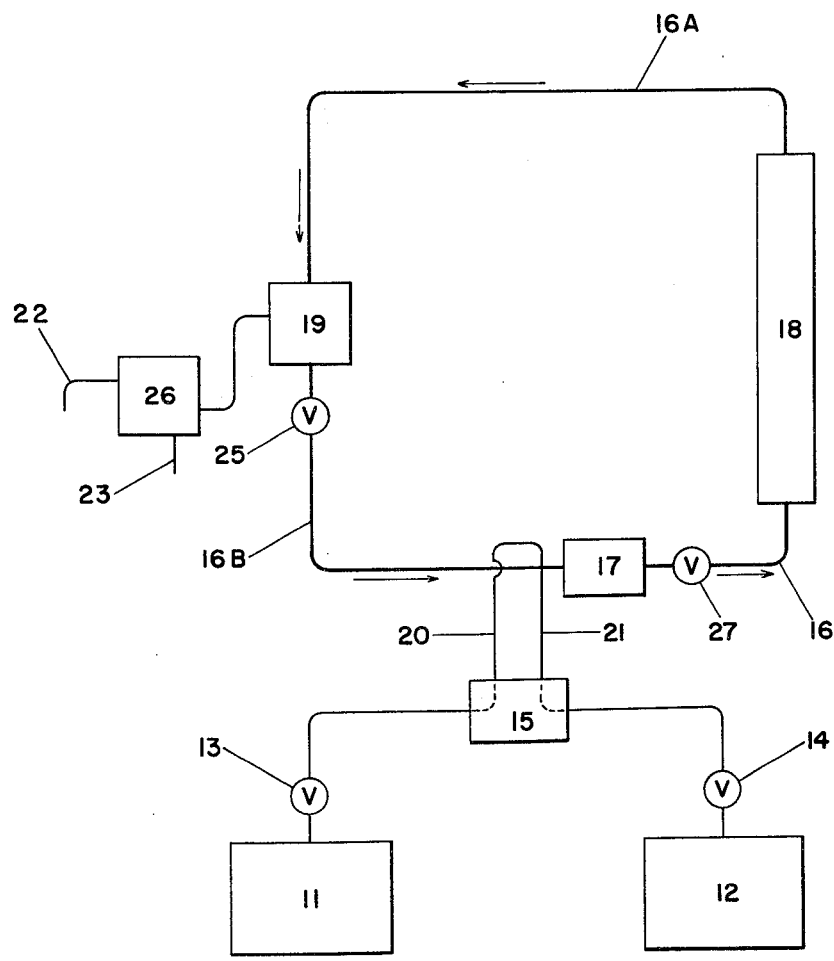
INVENTOR.
Ralph C. Hauze
BY 3,178,481
DINITROTOLUENE MANUFACTURE
Ralph C. Hauze, Tamaqua, Pa., assignor to Atlas Chemical Industries, Inc., Wilmington, Del., a corporation of Delaware
Filed Jan. 7, 1963, Ser. No. 249,766
7 Claims. (Cl. 260—645)

This invention relates to a method of producing dinitroluene (DNT). More specifically, the present invention relates to a continuous process in which toluene is nitrated to form DNT. The present application is a continuation-in-part of U.S. application Serial Number 85,588, filed January 30, 1961, now abandoned.

A conventional method for the production of DNT from toluene involves a stepwise operation wherein the toluene is first nitrated to a mononitrotoluene product and later to a DNT product. These steps are carried out at different temperatures and frequently with different nitrating acid concentrations. Generally the conventional methods require separate nitrators or mixing tanks for the nitrations. It is customary to use the spent nitrating acid from the binitration, after fortification with fresh nitric acid, in the mononitration step. This operation requires numerous acid lines, mixing and feed tanks, pumps and a complex valving system.

It is an object of the present invention to provide a new method of nitrating toluene to produce dinitrotoluene.

It is another object of this invention to provide a high yield of DNT compared to the weight of the nitrating acid used.

It is a further object of this invention to provide a method of producing a DNT product having a high percent of the 2,4 DNT isomer.

It is another object of this invention to provide a method of producing DNT which may be carried out without recourse to the use of intricate or involved apparatus.

It is a further object to provide a method of producing DNT which may be carried out with a minimum of equipment and which maintains a minimum balance of explosive material in the equipment while the nitrating reaction is being carried out.

These and other objects of this invention will become apparent from a study of the following description when taken in conjunction with the accompanying drawing, in which the figure is a schematic diagram showing a preferred embodiment of the process which is the subject matter of the present invention.

The present method of producing DNT contemplates a cycle process wherein toluene and nitrating acid are separately added to a supply of nitration medium. The nitrating acid contains sufficient nitric acid to maintain a ratio of not more than about 2.0 parts by weight of nitric acid to 1 part by weight of toluene. Preferably the ratio of the volume of toluene to the volume of nitration medium is between 2.5 and 8.0 parts of toluene to 1000 parts of nitration medium. The resulting mixture of toluene, nitrating acid and nitration medium are maintained in a moving stream at a temperature of between 160 and 190° F. until a reaction product comprising DNT and spent acid is produced. A portion of the reaction product may then be removed and a DNT product separated therefrom. The portion of reaction product not removed is cycled and utilized as a source of supply of additional nitration medium.

Preferably, the present method of producing DNT contemplates a method of producing DNT wherein separate moving streams of toluene, nitrating acid, and nitration medium are mixed. Preferably, a continuous moving stream of nitration medium is placed in a reaction system and continuous moving streams of toluene and nitrating acid are added to the system. Preferably, the toluene and nitrating acid enter the reaction system in such a manner that intimate contact with each other and with the contents of the reaction system is achieved upon entry into the system. In a preferred arrangement, the reaction system comprises a loop of piping which includes a heat exchange unit. The heat exchange unit serves as a means to dissipate the heat of the nitration reaction and as a means of maintaining control of the temperature in the system. Upon the entry of the moving streams of toluene and nitrating acid into the system and the admixing thereof with the system contents, the exothermic nitration reaction commences and a moving stream of reactants, reaction product and nitration medium is formed. The temperature of the mixed moving stream is allowed to rise to a point between about 160° F. and about 190° F., and maintained there for a time sufficient to complete the nitration of toluene to DNT. Generally, a time interval of at least 5 seconds is sufficient to perform the nitration. A reaction temperature in the range of between about 160° F. and about 190° F. has been found to give particularly satisfactory yields of DNT product which contain a high portion, generally in the range of from about 75 to about 85%, of the 2,4 isomer. Temperatures of less than about 160° F. are generally insufficient to insure the complete nitration of toluene to DNT and a nitration product produced at such temperatures will frequently be found to contain both di- and mononitrotoluene. Temperatures of over 190° F. are favorable to reactions which decrease the yield of DNT by the formation of trinitration products. A temperature level of about 185° F. has been found to give consistent and high yields of DNT product. The elongated reaction system is desirably so proportioned that the nitration of the toluene feed takes place in a single pass of the system and in order to prevent a solidification of nitrated product or the nitration medium in the loop reaction system, it is preferable that the temperature in all portions of the loop be maintained above about 140° F.

The present method provides a means of utilizing a low weight ratio of nitric acid to toluene to economically produce DNT. The present method facilitates the use of a ratio of less than 2.0 parts by weight of nitric acid to 1 part by weight of toluene. Preferably, sufficient nitric acid is provided so the nitration reaction proceeds at a reasonable rate of speed. Suitable weight ratios of nitric acid to toluene range between 1.3 and 2.0.

The nitration medium of the present method is comprised of DNT and spent acid. The spent acid portion normally contains a maximum of about 5% nitrobodies therein. The nitration medium may be considered a carrier which conducts both the nitric acid and toluene feed materials through the reaction system and moderates the heat produced by the nitration reaction. Generally a rather large volume of nitration medium is utilized as compared with the volume of toluene added to the system. This ratio generally ranges from about 2 to about 10 parts by volume of toluene to 1000 parts by volume of nitration medium.

In a preferred embodiment of the invention, a portion of the product from the nitration reaction equal in amount to the toluene and nitrating acid feed is continuously withdrawn from the reaction system and the DNT product separated. The portion of the product from the nitration reaction not removed is cycled to the point in the loop reaction system at which the separate streams of toluene and mixed nitrating acid are fed, mixed therewith and then recycled through the system. The separation of the DNT product and the spent acid product may be effected by either a continuous or a batch process. A satisfactory method in either case is to separate the DNT from the mixture of nitration medium by gravity separation, neutralize the resultant product with soda ash solution and, while the product is still in the molten state, wash with warm water of at least about 140° F., again separate the DNT product by gravity, and allow the product to solidify. If it is desired, the DNT product may then be dried. The end product of the above described process is a DNT product of high purity.

The product of this invention is a valuable source of DNT material which is particularly useful as an intermediate in the dye industry, as an intermediate in the plastic industry and in the production of explosive products.

Referring to the drawing, the mixed acid and toluene are separately stored in supply tanks 11 and 12 and supplied to the reaction system through valves 13 and 14, proportioning pump 15 and lines 20 and 21. The reaction system includes an elongated piping loop having portions 16, 16A and 16B, a heat exchange unit 18, a means of mixing the reactants and circulating the reaction products through the reaction system, such as centrifugal circulating pump 17 and a product take-off facility, such as a vented constant head tank 19. Valve 27 is an additional control valve placed just past the discharge end of centrifugal circulating pump 17 and facilitates a throttling of the circulation through the reaction system if required. In operation, the nitrating acid, usually mixed acid made up of nitric and sulphuric acids, and toluene are separately added to the reaction system by proportioning pump 15. The toluene and mixed acid are fed into the loop system at a point near the intake end of circulating pump 17, through lines 20 and 21. The circulating pump 17 is preferably located at a point in the reaction system just prior to the heat exchange unit 18. Although the reaction between the toluene and the nitrating acid is exothermic, a portion of the pipe in the reaction system, 16 and 16B, may advantageously be steam traced to aid in the elevation of the temperature of the pipe contents in portion 16 to a level sufficient to initiate the nitration reaction and to maintain a temperature of at least about 140° F. in order to insure that the nitration products contained in the pipe portion 16B remain liquid. The reaction system is arranged so that the heat exchange unit, 18, is positioned to maintain close control of the nitration temperature.

After the nitration reaction, a portion of the moving stream comprised of the resultant DNT and spent acid mixture is removed from the system through vented constant head tank 19. This portion is removed at a rate corresponding to the rate at which toluene and nitrating acid are fed into the system.

The DNT product is separated from the spent acid by a continuous gravity separation carried out in separation tank 26. The liquid DNT product is allowed to overflow from the top of the separation tank 26 through outlet 22 and the spent acid is taken from the lower portion of the separation tank through outlet 23. Some of the spent acid may be fortified with additional nitric and sulfuric acid and reused as nitrating acid in the process.

The reaction system further includes a connecting pipe 16B which joins the vented constant head tank 19 and the intake of centrifugal pump 17 through valve 25. The purpose of the loop completion portion 16B is to permit cycling of the contents of the system. Initially the completed loop permits the cycling of a charge of waste acid while the temperature of the loop system is adjusted to the required level to initiate the nitration reaction. During the nitration reaction section 16B permits a flow of a portion of the DNT-spent acid mixture from vented constant head tank 19 to the intake of circulating pump 17.

The above described pipe portions of the loop system may be suitably composed of stainless steel, #304 is eminently suited, Pyrex glass, Teflon or glass-lined pipes.

The molten DNT product removed from separation tank 26 may then be neutralized by agitation with a soda ash solution and the DNT product separated from the resulting soda ash-DNT emulsion by passing the emulsion through a baffled separating tank equipped with a sight glass for control of DNT take-off. If desired, a further washing of the DNT product may be made at this point. Preferably, such a wash would be made with water of at least about 140° F. The wash water may then be separated from the DNT product by gravity separation. The temperature in the above described neutralization, washing and separation steps is regulated to maintain the DNT product in a molten state. The DNT products of the present invention are found to remain molten at temperatures of about 140° F. and above.

The molten DNT product from the above neutralization, washing, and separation steps is aptly suited to be fed onto a water cooled revolving drum to solidify and be either flaked or shredded.

The nitration process described above may be stopped by stopping proportioning pump 15 or by closing valves 13 and 14 which connect the supply of toluene and nitrating acid with proportioning pump 15. Preferably when the process is stopped, the nitration reaction product comprised essentially of DNT and spent acid, remaining within the reaction system is cycled for at least 15 minutes. The purpose of this procedure is to avoid "after nitration" reactions by insuring that no nitratable material remains in the system. The nitration medium in the closed loop may then be permitted to cool, solidify, and remain in the loop until the process and equipment are again used.

It has been found that a mixed nitrating acid which is eminently suited to use in the present invention is comprised of between about 60% and about 68% $H_2SO_4$ between about 20% and about 28% $HNO_3$ and between about 8% and about 12% $H_2O$. Spent acid may also be utilized as a source of nitrating acid, as contemplated by this invention, in such case, the spent acid is butted with additional nitric and sulfuric acid to correspond to the acid-water content of the above-mentioned nitrating acid and in addition, may contain a small percent, generally less than about 5% by weight of the entire mixture, of nitrobodies. It will be understood that the term "nitrating acid" as used herein includes nitrating acid made with spent acid.

Utilizing a nitrating acid of the above acid concentrations, it has been found that with the proportioning pump adjusted to deliver from about 2.5 to about 4 parts by volume of nitrating acid to about 1 part by volume of toluene a very satisfactory toluene-nitrating acid mixture for carrying out the present invention is obtained.

The following examples will illustrate a preferred manner in which the present invention may be practiced.

*Example 1*

The complete nitration loop utilized in carrying out this example was 36′ in length and had a capacity of 19 gallons. The loop area corresponding to 16 of the accompanying drawing was composed of ¾″ I.D. stainless steel pipe and was steam traced to maintain a temperature of at least about 140° F. therein. The heat exchange unit, corresponding to 18, was a standard 13.5 square foot Pyrex glass tube and shell type heat exchanger approximately 18′ in length. The loop area corresponding to 16A was composed of 1″ Pyrex glass pipe. The loop section corresponding to 16B was composed of 1″ stainless steel pipe and was steam traced so that a temperature of at least about 140° F. was maintained therein. A centrifugal circulating pump corresponding to 17 with a pumping capacity of 16 g.p.m. under these operating conditions was mounted in the system. A Milton-Roy proportioning pump corresponding to 15 is set so as to have a pumping capacity of about 30 pounds of toluene per hour and a pumping capacity of about 212 pounds of nitrating acid per hour and placed into the system. The proportioning pump was connected to separate supplies of toluene and nitrating acid and positioned so as to feed monitored amounts of toluene and nitrating acid separately into the reaction system at a point just prior to the intake end of circulating pump 17. The heat exchange unit was comprised of an outer shell having internal baffles, and encompassing a bundle of thin-walled tubes. The nitration mixture was passed through the area between the tubes and the shell. Water from a temperature-regulated source was passed through the tubes. The heat exchange unit was used to heat the initial system charge of recirculated spent acid to a temperature level within the operating range required for the toluene nitration. After the system operating temperature had been attained the heat exchange unit was utilized to remove the heat generated by the nitration reaction and to maintain a nitration temperature in the range of between about 160° F. and about 190° F.

The reaction system utilized in carrying out this example further included a vented constant head tank, corresponding to 19 of the drawing, to facilitate the removal of reaction product.

A supply of toluene and a supply of nitrating mixed acid consisting of about 26% nitric acid, about 64% sulfuric acid and about 10% water was placed in connective position to the intakes of the proportioning pump. The proportioning pump was adjusted to separately supply about 14.5 g.p.h. of mixed nitrating acid and about 4.3 g.p.h. of toluene into the loop system.

In the initial start-up the loop system was filled with spent nitrating acid as nitration medium. The water supplied to the heat exchange unit was adjusted so that a temperature of about 170° F. was maintained in the heat exchange unit. The circulating pump was then started and the contents of the system circulated at a rate of 16 g.p.m. The circulating spent acid was allowed to reach a temperature of about 170° F. The proportioning pump was started and a supply of toluene and mixed acid fed into the loop. The heat exchange unit was then adjusted to remove heat from the system. The stream of nitration mixture, comprised of recycled spent acid, nitrating acid and toluene, was allowed to reach a temperature of about 170° F.

From measurement, it was determined that the heat exchange unit, which corresponds to 18 of the drawing and the short portion of piping after the circulating pump and prior to the heat exchange unit, which corresponds to 16 of the drawing, have a combined volume of 2 gallons. Using this figure together with the circulating pump setting of 16 g.p.m. and the temperature level of 170° F. which was maintained in the heat exchange unit, it was determined that the stream had a residence time at an elevated temperature of about 170° F. for a period of about 7.5 seconds.

As the toluene and nitrating acid were fed into the system a portion of the material in the reaction system, equal in amount to the toluene and nitric acid feed was removed. The removed material was initially the spent acid utilized to fill the system and later the reaction product. The portion removed was allowed to flow through the overflow outlet of a vented constant head tank, corresponding to 19 of the drawing, and into a separation tank, corresponding to 26 of the drawing. The liquid DNT product was allowed to overflow from the top of the separation tank and the spent acid was removed from the bottom portion of the separating tank. The vented constant head tank and the separation tank were both steam traced to insure the flow of DNT and spent acid therethrough.

The portion of reaction product not removed in the vented constant head tank, was returned through a return line, corresponding to 16B of the drawing, to the point of entry of toluene and mixed nitrating acid into the system.

In this example, the process was continued for a period of approximately 35 minutes. It was found that 18.15 lbs. of toluene and 124.1 lbs. of mixed acid were used. The DNT product was neutralized by agitation with sodium carbonate solution, washed, separated from the wash water, dried and weighed. It was found that 31.79 lbs. of DNT were produced directly and an additional 3.0 pounds of recoverable product was contained in the waste acid produced, representing a total yield of 97% based on the weight of toluene. The DNT produced from this nitration analyzed 85% 2,4 DNT and 15% 2,6 DNT by an infrared spectrophotometer examination.

*Examples II through VI*

The following examples, shown in tabular form, were conducted utilizing the process and the loop nitration arrangement described in Example I:

|  | II | III[1] | IV[1] | V[1] | VI[1] |
| --- | --- | --- | --- | --- | --- |
| Nitrating acid analysis, percent: |  |  |  |  |  |
| $HNO_3$ | 24.0 | 23.9 | 25.5 | 27.0 | 25.2 |
| $H_2SO_4$ | 66.1 | 61.4 | 62.3 | 60.6 | 61.4 |
| $H_2O$ | 9.8 | 9.4 | 9.4 | 9.8 | 9.9 |
| $HNOSO_4$ | 0.1 | 1.4 | 0.9 | 1.1 | 2.0 |
| Nitrobody | 0.0 | 3.9 | 1.9 | 1.5 | 1.5 |
| Proportional pump setting, g.p.h.: |  |  |  |  |  |
| Toluene | 3.0 | 3.0 | 3.0 | 3.2 | 3.0 |
| Nitrating acid | 10.0 | 10.0 | 10.0 | 10.0 | 8.5 |
| Circulating pump setting in g.p.h. | 960 | 960 | 960 | 960 | 960 |
| Nitration temp., °F | 185 | 185 | 187 | 185 | 184 |
| Residence time in seconds at nitration temp. | 7.5 | 7.5 | 7.5 | 7.5 | 7.5 |
| Length of run in minutes | 197 | 36 | 60 | 55 | 72 |
| Pounds toluene used | 101.5 | 18.2 | 29.0 | 27.2 | 32.7 |
| Pounds mixed acid used | 686 | 131.4 | 204.4 | 185.1 | 207.9 |
| Weight ratio of toluene to nitric acid used | 1.62 | 1.73 | 1.79 | 1.84 | 1.60 |
| Volume ratio of toluene to nitration medium | 3.2 | 3.2 | 3.2 | 3.4 | 3.2 |
| Pounds DNT recovered | 142 | 32.0 | 48.3 | 44.7 | 61.6 |
| Pounds DNT in waste acid | 22 | 2.9 | 6.0 | 2.5 | 2.6 |
| Total pounds DNT mfgd | 164 | 34.9 | 54.3 | 47.2 | 64.2 |
| Total DNT yield, percent | 82.0 | 97.3 | 94.7 | 86.2 | 99.5 |
| Analysis of— |  |  |  |  |  |
| 2,4 DNT, percent | 82 | 80–90 | 80.7 | 83.5 | 80.6 |
| 2,6 DNT, percent | 8 | 10–20 | 14.3 | 14.7 | 17.4 |
| M.P. range of DNT product, °C | 30–63 | 30–59 | 30–60 | 30–60 | 30–60 |

[1] These nitrations were made using a butted waste acid from a preceding nitration after substantially complete removal of DNT.

What is claimed is:

1. A cycle process of producing dinitrotoluene which comprises separately adding to a nitration medium comprising dinitrotoluene and spent acid as hereinafter described, toluene, and a nitrating acid containing nitric acid in an amount not more than about 2.0 parts by weight of nitric acid to 1.0 part by weight of the said toluene, the volume of the added toluene and the volume of the said nitration medium being in the ratio of between about 2 and about 10 parts by volume of toluene per 1000 parts by volume of said nitration medium maintaining the resulting mixture of toluene, nitrating acid and nitration medium in a moving stream and at a temperature of between about 160 and about 190° F. until a reaction product comprising dinitrotoluene and spent acid is produced, removing a portion of said reaction product and, cycling the remaining portion as additional nitration medium.

2. A process of producing dinitrotoluene which comprises adding separate continuously moving streams of toluene and a nitrating acid, containing from about 20% to about 28% nitric acid, to a loop reaction system, said nitric acid and toluene being added in a weight ratio of not more than 2.0 parts by weight of nitric acid to one part by weight of toluene mixing the said separate streams of toluene and nitrating acid with a continuously moving stream of nitration medium comprised of dinitrotoluene and spent acid, to form a continuous moving stream of reaction mixture the volume of the added toluene and the volume of the nitration medium being in the ratio of between 2 and about 10 parts by volume of toluene to 1000 parts by volume of nitration medium, maintaining said formed mixture at a temperature of from about 160° to about 190° F., until a continuous stream of nitration medium comprised of dinitrotoluene and spent acid is produced, cycling and mixing a portion of said continuous stream of nitration medium with the continuous streams of toluene and nitrating acid, continuously removing the portion of nitration medium not cycled and, separating the dinitrotoluene from the spent acid in said portion.

3. A process of continuously producing a dinitrotoluene product by passing a continuous moving stream of toluene, nitrating acid, and nitration medium, through an elongated reaction system, said nitrating acid containing nitric acid in an amount between about 1.3 and about 2.0 parts by weight of toluene, the volume of the added toluene and the volume of the nitration medium being in the ratio of between 2 and about 10 parts by volume of toluene to 1000 parts by volume of nitration medium, maintaining said stream at a temperature of between about 160° and about 190° F. until a nitration reaction product comprised of dinitrotoluene and spent acid is produced, cycling a portion of said nitration reaction product through said elongated reaction system as an additional amount of nitration medium, removing the portion of reaction product not cycled and separating the dinitrotoluene from the spent acid in said portion.

4. A continuous method of producing dinitrotoluene which comprises mixing continuous moving streams of nitration medium, toluene and nitrating acid, said nitration medium comprised of dinitrotoluene and spent acid, said nitrating acid consisting of about 60–68% weight of sulfuric acid, about 20–28% by weight of nitric acid and about 8–12% by weight of water, said nitrating acid containing nitric acid in an amount between about 1.3 and about 2.0 parts by weight of toluene, the volume of the added toluene and the volume of the nitration medium being in the ratio of between 2 and about 10 parts by volume of toluene to 1000 parts by volume of nitration medium, heating said mixture to a temperature of between about 160 and about 190° F. for a time sufficient to form a reaction product comprised of dinitrotoluene and spent acid, cycling a portion of said reaction product as additional nitration medium, mixing said product with separate, continuous streams of toluene and nitrating acid to form a mixture suited to carrying out the foremention process, removing the portion of reaction mixture not cycled and separating the dinitrotoluene from the spent acid in said portion.

5. The process described in claim 4 wherein the reaction is maintained at a temperature of between about 160° F. and about 190° F. by means of a heat exchange unit.

6. A process of producing a dinitrotoluene product which comprises mixing separate continuous moving streams of toluene and nitrating acid with a continuous moving stream of nitration medium, said nitrating acid containing nitric acid in an amount between about 1.3 and about 2.0 parts by weight of toluene, the volume of the added toluene and the volume of the nitration medium being in the ratio of between 2 and about 10 parts by volume of toluene to 1000 parts by volume of nitration medium, the said nitration medium comprised of dinitrotoluene and spent acid, maintaining the resultant mixture at a temperature of between about 160 and about 190° for a sufficient time to form a reaction product comprised of dinitrotoluene and spent acid, cycling a portion of said reaction product as an additional source of nitration medium, mixing said portion with said continuous moving streams of toluene and nitrating acid, removing the portion of reaction product not cycled and separating the dinitrotoluene from the spent acid in said portion.

7. The process described in claim 6 wherein the nitrating acid consists of about 60% to about 68% by weight of sulfuric acid, about 20% to about 28% by weight of nitric acid, and from about 8% to about 12% by weight of water.

References Cited in the file of this patent

UNITED STATES PATENTS 2,947,791    Adams _____ Aug. 2, 1960